United States Patent Office 3,523,130
Patented Aug. 4, 1970

3,523,130
METHOD OF MAKING ALCOHOL-SOLUBLE COMPLEXES OF ALUMINUM
John L. Jones, North Plainfield, and Andrew M. Rubino, New Providence, N.J., assignors to Armour Pharmaceutical Company, Chicago, Ill., a corporation of Delaware
No Drawing. Continuation-in-part of application Ser. No. 603,133, Dec. 20, 1966, which is a continuation-in-part of application Ser. No. 472,684, July 16, 1965. This application Oct. 23, 1968, Ser. No. 770,104
The portion of the term of the patent subsequent to Jan. 7, 1986, has been disclaimed
Int. Cl. C07f 5/06
U.S. Cl. 260—448          9 Claims

ABSTRACT OF THE DISCLOSURE

The method of preparing an inorganic-organic coordinated complex of aluminum comprising refluxing for from 2 to 6 hours at atmospheric pressure an aqueous solution of basic aluminum chloride having the approximate formulation $Al_2(OH)_5Cl$, with the atomic ratio of aluminum to chlorine being between 1.88 and 1.95 to 1, reacting at a temperature of 50° C. to 120° C. said aluminum compound with a polyhydroxy compound having at least 2 carbon atoms, each of which is linked to a hydroxy group, to form a mixture, and then removing the water from said last-mentioned mixture by spray drying at atmospheric pressure to obtain a product having a water content of from about 1.0 to about 10 weight percent determined by Karl Fischer analysis.

---

The present invention is directed to a method of making alcohol soluble complexes of aluminum. It is a continuation-in-part of United States patent application Ser. No. 603,133 filed Dec. 20, 1966 entitled: Method of Making Alcohol Soluble Complexes of Aluminum and Preparations Employing the Complexes, now United States Letters Patent 3,420,932 issued Jan. 7, 1969. Such patent application Ser. No. 603,133 is a continuation-in-part of our patent application Ser. No. 472,684 filed July 16, 1965, now abandoned. The text of patent application Ser. No. 603,133 is incorporated herein by reference.

Patent application Ser. No. 603,133 is directed to a method of preparing an inorganic-organic coordinated complex of aluminum by mixing an aqueous solution of an aluminum-containing material, such as aluminum basic chloride, with a polyhydroxy compound, having at least 2 carbon atoms, each of which is linked to a hydroxy group, to form a mixture, followed by the heating of said mixture, and subsequent drying to yield the complex which has a water content of from about 1.0 to about 10 weight percent determined by Karl Fischer analysis.

The complex derived by the method of patent application Ser. No. 603,133 has great utility in anhydrous alcohol aerosol formulations used as antiperspirants. Thus, the complexes derived by the method of patent application Ser. No. 603,133 are both reasonably soluble in anhydrous alcohol, and reasonably compatible with the available aerosol propellants, such as the halogenated (fluoro chloro) hydrocarbons. While these complexes are satisfactory for usage in aerosol containers, yet it has proved desirable to achieve complexes which are more soluble in anhydrous alcohol and more compatible with the propellant. Increased solubility in anhydrous alcohol enables more concentrated aerosol formulations to be prepared. The use of anhydrous alcohol enables much of the extreme corrosion induced by aqueous media to the metal valves and containers for the aerosol preparation to be avoided.

Maximum compatibility with aerosol dispenser propellants is most desirable so as to minimize valve clogging and other impairment of the aerosol dispenser function.

This invention has as an object the provision of alcohol soluble complexes of aluminum which possess both increased solubility in anhydrous alcohol, and improved compatibility with aerosol propellants.

This invention has as a further object the provision of the aforesaid alcohol soluble complexes of aluminum.

Other objects will appear hereinafter.

We have discovered that if the basic aluminum chloride used to prepare the alcohol soluble complex is refluxed for between 2 to 6 hours, and preferably about 4 hours refluxing, within the temperature range of 100° to 110° C. prior to the complex formation with the polyhydroxy compound, and its atomic aluminum to atomic chlorine ratio adjusted to between 1.88 to 1.95 to 1, and preferably about 1.9 to 1, a more soluble in anhydrous alcohol and a more compatible with aerosol propellant complex is obtained upon the removal of water by spray drying at atmospheric pressure from the complex to the level of about 1.0 to about 10 weight percent determined by Karl Fischer analysis.

We have discovered that at least about 2 hours refluxing is needed to obtain this improvement. There does not appear to be a sharp maximum amount of time for refluxing. However, when refluxing is extended more than about 6 hours, the cost of the process is increased without any appreciable attendant advantage. Moreover, protracted refluxing above 6 hours may lead to undesirable decomposition of the basic aluminum chloride.

The basic aluminum chloride sometimes referred to as aluminum basic chloride or aluminum chlorohydroxide, used in the subject invention has the nominal formulation $Al_2(OH)_5Cl$. However, as above-indicated, the actual quantitative ratio of atomic aluminum to atomic chlorine for best results should be within the range of 1.88 to 1.95 to 1, and preferably about 1.9 to 1.

The preferred coordination compounds (complexes) of the present invention have the formula:

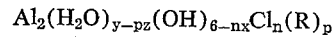

$$Al_2(H_2O)_{y-pz}(OH)_{6-nx}Cl_n(R)_p$$

wherein R is the coordinating moiety of a polyhydroxy compound having a carbon chain in which at least two carbon atoms link a hydroxyl group to said chain; $y$ is from 2 to 6 and need not be a positive integer; $p$ is the number of mols of the polyhydroxy compound and need not be a positive integer; $z$ is the number of available coordination positions occupied by R; $n$ is 1 to 4 but need not be a positive integer; and $x$ is 1, with $nx$ being from 2 to 4.

The aforesaid formula should not be interpreted as meaning that only water is displaced by R, since R could also displace any OH which are bound to the aluminum atoms. This could also occur, inter alia, by virtue of the condensation of the polyol hydroxy groups with the hydroxy groups bonded to the aluminum atoms. Where more than one hydroxy group of a given polyol molecule condenses with the hydroxy groups bonded to aluminum, chelate structures may be formed. Still other mechanisms can be postulated.

The optimum coordination compounds (complexes) of the present invention have the formula:

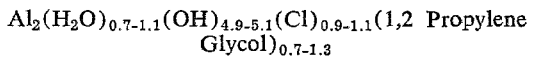
$$Al_2(H_2O)_{0.7-1.1}(OH)_{4.9-5.1}(Cl)_{0.9-1.1}(1,2\ \text{Propylene Glycol})_{0.7-1.3}$$

In the above formula, the 1,2-propylene glycol may be present in the complex in a number of ways, namely with both carbinol hydrogen atoms being lost by condensation or neutralization, or with only one carbinol hydrogen atom being lost by condensation or neutralization, or with both hydroxy groups remaining intact and coordinated and/or chelated to one of the aluminum atoms.

Suitable polyhydroxy compounds for use in the practice of the present invention include: propylene glycol; 1,1,1-trimethylol propane; 1,3-butylene glycol (1,3-butane-diol); glycerine (1,2,3-trihydroxy propane); 2-methyl-2,4-pentane-diol; neopentyl glycol (2,2-dimethyl-1,3-dihydroxy pentane); polyethylene glycol (mol wt.=400); Polyglycol 15–200 (a Dow material having an ethereal linkage between propylene oxide and ethylene and condensed with glycerine in which each chain has a terminal hydroxy group (mol wt.=2700); p-xylene α, α=diol; and polyepichlorohydrin; butyne-1,4-diol; 2-ethyl-1,3-hexane-diol; and polypropylene glycol (av. mol. wt.=400)).

The preferred polyhydroxy compound is 1,2-propylene glycol. In addition, we have obtained superior products with 1,3-butane diol, and with trimethylolpropane.

In one embodiment of the present invention, we are able to modify aluminum chlorohydroxide to obtain a coordination compound of superior properties.

Specifically, we prepared an aqueous solution of aluminum chlorohydroxide ranging from 43–50 percent solids and to this solution, refluxed for from 2 to 6 hours at atmospheric pressure, added from about 53 to about 100% of 1,2-propylene glycol (based on the aluminum chlorohydroxide solids content), reacted the resultant mixture at 50° to 120° C. and spray dried the mixture at atmospheric pressure to a product having a water content of from about 1.0 to about 10 weight percent determined by the Karl Fischer assay method.

The reaction between the aluminum chlorohydroxide and the polyhydroxy compound should be effected at a temperature within the range of 50 to 120° C. Preferably, the reaction temperature should be of the order of 80° to 110° C. We have found that a temperature range of 90° to 105° C. is optimum. A reaction can be effected in the presence of agitation, such as stirring or other conventional mixing procedures. The time of the reaction is temperature dependent, and operational times may be determined for any specific concentrations and specific starting materials by routine testing within the skill of a worker in the art. Generally, a duration of the order of from a few minutes to several hours constitutes adequate reaction time. In addition to the reaction time being temperature dependent, it is also dependent upon the extent of agitation applied to the mixture.

The coordination compounds of the present invention are dried by spray drying to a product containing between about 1 and 10 weight percent of moisture as determined by the Karl Fischer assay method.

The spray drying temperatures to be used in the process of the present invention will vary depending on the size of the spray drier. With the Bowen No. 2 7-foot diameter spray drier and larger, an inlet temperature of 200° to 320° C. can be used with the preferred inlet temperature being about 225° to 270° C. An outlet temperature range of 100° C. to 160° C. should be used. For laboratory size spray driers, such as a Bowen Flat-Bottom laboratory spray drier (30-inch diameter) an inlet temperature range of the order of 90° C. to 260° C. may be used, with a preferred inlet temperature range of 150° C. to 210° C. With such small size spray driers, an outlet temperature within the range of 80° to 125° C. may be used, with the preferred outlet temperature range being between 100° C. and 120° C.

It has been found that the spray dried product should be cooled as rapidly as possible to a temperature of 50° C. or less.

One system, which has been proven successful, consists of an air conveying system. Product is removed from the drier waste gas stream through a rotary lock valve. The product at a temperature of approximately 100° to 160° C. is dropped into an air stream, cooled and conveyed to a final collection point. The conveying air is ambient air that has been cooled to less than 45° F. maximum by a refrigeration system. At the cold temperature, the air is saturated with water vapor. In the process of cooling the hot product, the air is naturally warmed to 70–80° F. with no additional water being added to the air since no additional product drying is occurring. The resultant relative humidity of the air is less than 40%. Any ambient air temperature below 45° F. is advantageous due to the lower relative humidity after being heated. The temperature of the final product is dependent upon the air flow rate. A flow rate of approximately 10% of the total drier air flow rate cools the product to 80° F. with a 45° F. inlet temperature. If the spray dried product is not cooled as rapidly as possible, then deterioration sets in, and in particular, impaired solubility in anhydrous alcohol, and reduced compatibility with aerosol propellants, such as fluorohydrocarbons results.

As above-indicated the range of water as determined by the Karl Fischer assay method in the final product should be of the order of 1 to 10 weight percent. Preferably, it should be of the order of about 4½ to 8%, with about 6 weight percent being optimum.

In all cases, an excess of polyhydroxy compound should be used to prepare the coordination compounds of the present invention, since a significant amount of polyhydroxy compound is lost by evaporation (such evaporated polyhydroxy compound can be recovered by condensation). The evaporation of the polyhydroxy compound occurs during refluxing, although where spray drying forms the drying method, a major portion of the evaporated polyhydroxy compound is lost during spray drying. With spray dried coordination compounds of the present invention depending on the volatility of the polyhydroxy compound and the conditions of spray drying, as much as 30 to 50 weight percent of the initial amount of the polyhydroxy compound is lost on evaporation. For this reason, where evaporation of glycol is encountered, it is necessary to start off with an excess amount of glycol, since if the stoichiometric amount of glycol is used initially, the correct ratio of glycol to aluminum will not be achieved in the final product. During spray drying, glycol and water are the only materials being removed. Thus, for example, we can commence with a ratio of 0.95 mol of aluminum per mol of propylene glycol and get a final product which contains a ratio of about 2 mols of aluminum per mol of propylene glycol after spray drying.

The complex (that is, the "dry" product) produced by our method exhibits antiperspirant properties which compare favorably by subjective evaluation to aluminum chlorohydroxide. This effect is believed to result from our retention of the ionicity of the aluminum in our complex.

While the exact mechanism of the reaction is not fully understood, it is believed to involve the displacement of free and bound water and, possibly, a displacement or condensation with hydroxy groups attached to the aluminum ion. The hydroxy groups of the polyhydroxy compound appear to be unreactive with the chloride ion.

We have endeavored to work up a simulated aerosol medium for ascertaining compatibility and solubility of our product. Since the normal fluorocarbons used in aerosols were too volatile for practical measurements, carbon tetrachloride was arbitrarily selected because of its nonpolar similarity and nonvolatility. For convenience, 60.0 g. of a 30% solution of the antiperspirant in anhydrous SD-40 alcohol was titrated with carbon tetrachloride. The ml. of CCl₄ required to cause the first permanent haze was called the compatibility number. Although it is recognized that the absolute values of carbon tetrachloride and various fluorocarbons would not be the same, there is a proportional relationship.

In the examples set forth below, the compatibility is given as the number of ml. of CCl₄.

The products produced by the process of the present invention have a greater compatibility and a greater solubility in respect to aerosol propellants.

The preparation of the basic aluminum chloride in accordance with the process of the present invention may be illustrated as follows:

EXAMPLE A

Into a 500-gallon reactor equipped with agitation and a heat exchanger was charged 2950 pounds of 24° Bé. AlCl₃ and 1720 pounds of water. After preheating, 580 pounds of aluminum powder was added in 10 pound increments maintaining an average reaction temperature of about 85° C. After approximately 6 hours, when nearly all of the aluminum has dissolved, an additional 35 pounds of aluminum powder was added and the batch filtered.

The aforesaid composition assayed 12.4% Al and 8.5% Cl. The atomic ratio may be derived from the aforesaid analysis, atomic ratio $$= \frac{\text{weight of aluminum/atomic weight of aluminum}}{\text{weight of chlorine/atomic weight of chlorine}}$$

Into a glass-lined 500-gallon reactor equipped with an agitator, heat exchanger and condenser was charged 3300 pounds of the aforesaid solution. The temperature of the solution was elevated to 225° F. and maintained at this temperature for a period of 4.0 hours.

The use of the refluxed basic aluminum chloride prepared as above to make the complex of the present invention is set forth below.

EXAMPLE 1

To the solution derived from Example A was added 1158 pounds of propylene glycol and the mixture allowed to concentrate (Maximum temperature of 240° F.) to about 3530 pounds or a viscosity of about 180 cps. by maintaining the mixture at 225° F.

The concentrated solution was cooled and dried in a Bowen 7-foot spray dryer at an outlet temperature of 290° F. to yield 1728 pounds of alcohol soluble solids assaying 20.2% Al, 13.7% Cl, 6.5% H₂O by Karl Fischer assay, 32.8% propylene glycol, compatibility=197 ml. CCl₄.

Examples 2 and 3 illustrate the comparison between basic aluminum chloride that had been refluxed in accordance with the process of the present invention and basic aluminum chloride that had not been refluxed. It is to be emphasized that Example 2 yielded a satisfactory product, but that the product of Example 3 is superior.

EXAMPLE 2

2030 g. of aqueous basic aluminum chloride solution and 790 g. of U.S.P. propylene glycol were subjected to heating at 90° C. for a period of two hours. The concentrate was spray dried through a Bowen Flat-Bottom spray dryer (30-inch diameter) at an inlet temperature of 500° F. and outlet temperature of 175° F. The white powdered product assayed 20.5% Al, 13.6% Cl, 7.7% H₂O and had a compatibility of 184 ml. CCl₄. The product was rapidly soluble (5–10 minutes) in anhydrous ethanol, but the solution was cloudy indicating incomplete association between the components and about 0.1% decomposition of the basic aluminum halide.

EXAMPLE 3

To 3050 g. of a 50% basic aluminum chloride solution added 60 g. of 32° Bé. aluminum chloride and subjected the mixture to reflux conditions (100–105° C.) for a period of 4.0 hours. To the hot solution was added 1204 g. of U.S.P. propylene glycol, and with agitation the solution was concentrated at 100–105° C. until a viscosity of 184 cps. was attained.

The concentrate was spray dried through a Bowen Flat-Bottom spray dryer (30-inch diameter) at an inlet temperature of about 300° F. and an outlet temperature of 245° F. The product assayed 19.8% Al, 13.5% Cl, 7.1% H₂O. The compatibility was 327 ml. CCl₄. The product was rapidly soluble in anhydrous ethanol and showed virtually no decomposition.

We cannot satisfactorily explain the improved solubility in anhydrous alcohol and the improved compatibility with aerosol propellant of the polyhydroxy complexes of the present invention. However, it is our belief that the refluxing in some fashion changes the structure of the basic aluminum chloride so that water is more readily released, which then permits a more ready replacement with glycol. This, in turn, produces a dried solid of lower water content and little or no decomposition (when basic aluminum chlorides lose water on drying, decomposition occurs resulting in alcohol insolubility and eventually even water insolubility). As a result, the solubility rate is not sacrificed (spray drying seems to be the primary factor which increases the solubility rate) and the compatibility with halocarbons is increased.

In summation, it can be said that refluxing does not have a significant effect on vacuum dried products except to slightly increase compatibility. It is a primary advantage of the spray drying process of the present invention in that products of lower water content can be made without the need for excessive quantities of glycol and with minimal decomposition. The low water content and reasonably low glycol content in the finished product tend to give higher compatibilities.

The complexes of the present invention have prime utility in aerosol formulations used as antiperspirants. Thus, more concentrated preparations may be prepared, and anhydrous alcohol may be used. The use of the anhydrous alcohol minimizes corrosion of the aerosol container and its metal elements.

The compatibility of the complexes of the present invention with the aerosol propellants facilitates the dispensing of the complexes of the present invention by means of aerosols. Thus, valve clogging and other malfunction of the aerosol container and its components is minimized.

The present invention may be embodied in other specific forms without departing from the spirit or essential attributes thereof and, accordingly, reference should be made to the appended claims, rather than to the foregoing specification as indicating the scope of the invention.

It is claimed:

1. The method of preparing an inorganic-organic coordinated complex of aluminum having relatively high solubility in anhydrous ethanol and compatibility with aerosol propellants comprising refluxing for between about 2 to 6 hours an aqueous solution of basic aluminum chloride in which the atomic ratio of aluminum to chlorine is between 1.88 to 1.95 to 1 at a temperature of between about 100° to 110° C., reacting said refluxed basic aluminum chloride with a polyhydroxy compound, having at least 2 carbon atoms, each of which is linked to a hydroxy group, at a temperature of between about 50° to 120° C., and drying said mixture by removing water therefrom by spray drying at atmospheric pressure to yield a product containing from about 1.0 to about 10 weight percent water determined by Karl Fischer analysis, said product being said complex.

2. A method in accordance with claim 1 in which the basic aluminum chloride is refluxed for about 4 hours.

3. A method in accordance with claim 1 in which the atomic ratio of aluminum to chlorine is about 1.9 to 1.

4. A method in accordance with claim 1 in which the polyhydroxy compound is propylene glycol.

5. A method in accordance with claim 1 in which the reaction mixture of basic aluminum chloride and polyhydroxy compound is dried by spray drying said mixture at a temperature of between 80° C. and 320° C.

6. A method in accordance with claim 1 in which the product has a water content of from about 4½ to 8 weight percent determiend by Karl Fischer analysis.

7. A method in accordance with claim 1 in which the resulting product has the formula:

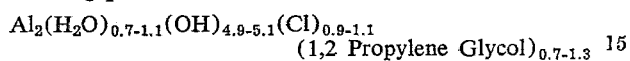

(1,2 Propylene Glycol)$_{0.7-1.3}$

8. A method in accordance with claim 1 in which the reaction temperature is between about 80° C. to 110° C.

9. A method in accordance with claim 1 in which the polyhydroxy compound is trimethylol propane.

References Cited

UNITED STATES PATENTS

| | | |
|---|---|---|
| 2,466,445 | 3/1949 | Landau. |
| 2,823,169 | 2/1958 | Brown et al. |
| 2,872,379 | 2/1959 | Neumann et al. |
| 3,359,169 | 12/1967 | Slater et al. |
| 3,420,932 | 1/1969 | Jones et al. |

TOBIAS E. LEVOW, Primary Examiner

H. M. S. SNEED, Assistant Examiner

U.S. Cl. X.R.

260—999